(12) United States Patent
Song

(10) Patent No.: US 11,745,802 B2
(45) Date of Patent: Sep. 5, 2023

(54) SIDE SILL ASSEMBLY OF VEHICLE WITH REINFORCED STIFFNESS AND METHOD FOR MANUFACTURING THE SAME

(71) Applicants: Hyundai Motor Company, Seoul (KR); Kia Corporation, Seoul (KR)

(72) Inventor: Won-Jung Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 16 days.

(21) Appl. No.: 17/565,194

(22) Filed: Dec. 29, 2021

(65) Prior Publication Data

US 2023/0070480 A1 Mar. 9, 2023

(30) Foreign Application Priority Data

Sep. 9, 2021 (KR) .................. 10-2021-0120465

(51) Int. Cl.
  *B62D 25/02* (2006.01)
  *B60J 5/04* (2006.01)
  *B62D 21/15* (2006.01)

(52) U.S. Cl.
  CPC .......... *B62D 25/025* (2013.01); *B60J 5/0437* (2013.01); *B62D 21/157* (2013.01)

(58) Field of Classification Search
  CPC .................. B62D 25/025; B62D 25/2036
  USPC ...................................................... 296/209
  See application file for complete search history.

(56) References Cited

U.S. PATENT DOCUMENTS

| 4,955,570 | A | * | 9/1990 | Benz | B23K 11/002 248/300 |
| 5,207,475 | A | * | 5/1993 | Hellstrom | B62D 25/025 296/187.12 |
| 5,613,727 | A | * | 3/1997 | Yamazaki | B62D 25/02 296/203.03 |
| 9,493,190 | B1 | * | 11/2016 | Alwan | B62D 25/025 |

FOREIGN PATENT DOCUMENTS

KR 20-1997-0051616 9/1997

* cited by examiner

*Primary Examiner* — Joseph D. Pape
(74) *Attorney, Agent, or Firm* — MORGAN, LEWIS & BOCKIUS LLP

(57) ABSTRACT

A side sill assembly of a vehicle with reinforced stiffness includes a side sill inner, a side sill outer, and a reinforcement unit provided between the side sill inner and the side sill outer. The reinforcement unit includes an upper member having a first upper surface and a first lower surface located lower than the first upper surface, wherein the first upper surface and the first lower surface are alternately disposed in a longitudinal direction of the vehicle; a lower member having a second upper surface and a second lower surface located lower than the second upper surface, wherein the second upper surface and the second lower surface are alternately disposed in the longitudinal direction of the vehicle; and an intermediate member bonded to the upper member and the lower member, respectively, between the upper member and the lower member.

18 Claims, 8 Drawing Sheets

SIDE SILL ASSEMBLY OF VEHICLE WITH REINFORCED STIFFNESS AND METHOD FOR MANUFACTURING THE SAME

CROSS-REFERENCE TO RELATED APPLICATION

The present application claims priority to Korean Patent Application No. 10-2021-0120465, filed on Sep. 9, 2021, the entire contents of which is incorporated herein for all purposes by this reference.

BACKGROUND OF THE INVENTION

Field of the Invention

The present invention relates to a side sill assembly configured to support a lower portion of a side surface of a vehicle and a method for manufacturing the same, and more specifically, to a side sill assembly of a vehicle with reinforced stiffness, and a method for manufacturing the same, which can protect a high-voltage battery mounted therein from impact in the event of a side collision while achieving lightweight.

Description of Related Art

A side sill is provided to exert the stiffness of a lower portion of a side surface of the vehicle.

Meanwhile, an eco-friendly vehicle, such as an electric vehicle or a hybrid electric vehicle, utilizes a lower portion of a center floor panel of a vehicle as a mounting space of a high-voltage battery that supplies power to a driving motor.

Recently, the eco-friendly vehicle does not share a platform with an internal combustion engine vehicle, and adopts a platform for only electric vehicle. This is because it is advantageous that a space under the center floor panel is utilized to increase the capacity of the mounted high-voltage battery to increase the mileage of the vehicle.

However, such a structure is exposed to the risk of damage to the high-voltage battery in the event of a side collision of the vehicle. The damage to the high-voltage battery leads to a fire, and fire due to damage to the high-voltage battery is difficult to extinguish unlike a general fire.

Therefore, the side sill should exert sufficient stiffness so that collision energy is not delivered to the high-voltage battery in the event of the side collision.

To the present end, a reinforcing structure is applied to the inside of the side sill including a side sill inner and a side sill outer.

For example, there is a side sill reinforcement structure which is applied to the inside of the side sill by manufacturing a reinforcement member by extruding an aluminum material. Although the aluminum extruded material may be lightweight, the manufacturing cost is high, weakening price competitiveness.

Meanwhile, as shown in FIG. 1, a reinforcement unit 130 of a steel press structure including reinforcement members 131 to 134 made of a steel material can further be manufactured and applied to the inside of the side sill. However, this can lower the cost, but there is a problem in that the weight is increased compared to the aluminum extruded material.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a side sill assembly of a vehicle with reinforced stiffness and a method for manufacturing the same, which utilizes an inexpensive material but provides sufficient stiffness performance even while suppressing the weight to a level of an aluminum material, reducing deformation due to impact in the event of a side collision.

According to a side sill assembly of a vehicle with reinforced stiffness according to various exemplary embodiments of the present invention for achieving the object, in the side sill assembly of the vehicle including: a side sill inner, a side sill outer, and a reinforcement unit provided between the side sill inner and the side sill outer, the reinforcement unit may include an upper member having a first upper surface and a first lower surface located lower than the first upper surface, wherein the first upper surface and the first lower surface are alternately disposed in a longitudinal direction of the vehicle; a lower member having a second upper surface and a second lower surface located lower than the second upper surface, wherein the second upper surface and the second lower surface are alternately disposed in the longitudinal direction of the vehicle; and an intermediate member bonded to the upper member and the lower member, respectively, between the upper member and the lower member.

The upper member and the lower member may be disposed in same phases as each other.

The first lower surface of the upper member may be bonded to the intermediate member, the second upper surface of the lower member may be bonded to the intermediate member, and a portion where the intermediate member may be bonded to the upper member and a portion where the intermediate member may be bonded to the lower member are alternately located on the intermediate member.

A flange portion extending upwards from width directional inside end portions of the vehicle of the first upper surface and the first lower surface of the upper member may be formed, and the flange portion may be bonded to a surface perpendicular to an inside surface of the side sill inner.

A width directional inside of the vehicle of the second lower surface of the lower member may become a welding surface bonded to an inclined surface of an inside surface of the side sill inner.

A nut mounting surface on which a lower end portion of a battery mounting nut configured to mount a battery on the welding surface is located may be formed, and the battery mounting nut may have the lower end portion bonded to the nut mounting surface.

The lower end portion of the battery mounting nut may be bonded to the welding surface by $CO_2$ welding or projection welding.

The first lower surface of the upper member and the intermediate member may be formed with through holes through which the battery mounting nut is provided to penetrate, respectively.

The battery mounting nut may be bonded to the first lower surface of the upper member and the intermediate member on portions formed with the through holes by $CO_2$ welding.

The first upper surface and first lower surface of the upper member may be connected through a first connection surface, and the second upper surface and second lower surface of the lower member may be connected through a second connection surface.

A first welding hole through which a welding tool may pass when the lower member and the intermediate member are bonded to the first upper surface of the upper member is formed.

The intermediate member may be bonded to the upper member and the lower member by spot welding.

The upper member and the lower member may be bonded to the side sill inner by spot welding.

The first lower surface of the upper member and the intermediate member may be formed with a second welding hole and a third welding hole, respectively, so that a welding tool passes through the second welding hole and the third welding hole when the lower member and the side sill inner are bonded.

Meanwhile, a method for manufacturing a side sill assembly of a vehicle with reinforced stiffness according to various exemplary embodiments of the present invention may include processing and preparing an upper member, a lower member, and an intermediate member in advance; bonding the upper member to an upper surface of the intermediate member; bonding the lower member to a lower surface of the intermediate member; bonding a reinforcement unit formed by bonding the upper member, the intermediate member and the lower member, to a side sill inner; and bonding upper and lower portions of a side sill outer to upper and lower portions of the side sill inner.

The bonding of the upper member, the bonding of the lower member, and the bonding of the reinforcement unit may be bonded by spot welding.

The method may further include bonding a nut that bonds a lower end portion of a battery mounting nut to the lower member, and may bond a circumference of the battery mounting nut to the upper member and the intermediate member between the bonding of the lower member and the bonding of the reinforcement unit.

The lower end portion of the battery mounting nut may be bonded to the lower member by $CO_2$ welding or projection welding, and the circumference of the battery mounting nut and the upper and intermediate members are bonded by $CO_2$ welding.

The bonding of the reinforcement unit may bond a flange portion formed to extend upwards from a width directional inside end portion of the vehicle of the upper member to a surface perpendicular to an inside surface of the side sill inner, and may bond a welding surface located on a width directional inside of the vehicle of the lower member to an inclined surface of the inside surface of the side sill inner.

According to the side sill assembly of the vehicle with reinforced stiffness and the method for manufacturing the same according to various exemplary embodiments of the present invention having the above configuration, it is possible to use the inexpensive material such as steel but exert stiffness corresponding thereto with the weight of the level equivalent to the expensive aluminum extruded material, implementing the side collision performance and saving the cost.

As described above, it is possible to improve performance against the side collision in the vehicle to which the high-voltage battery is applied, preventing fire caused by damage to the high-voltage battery due to the side collision.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
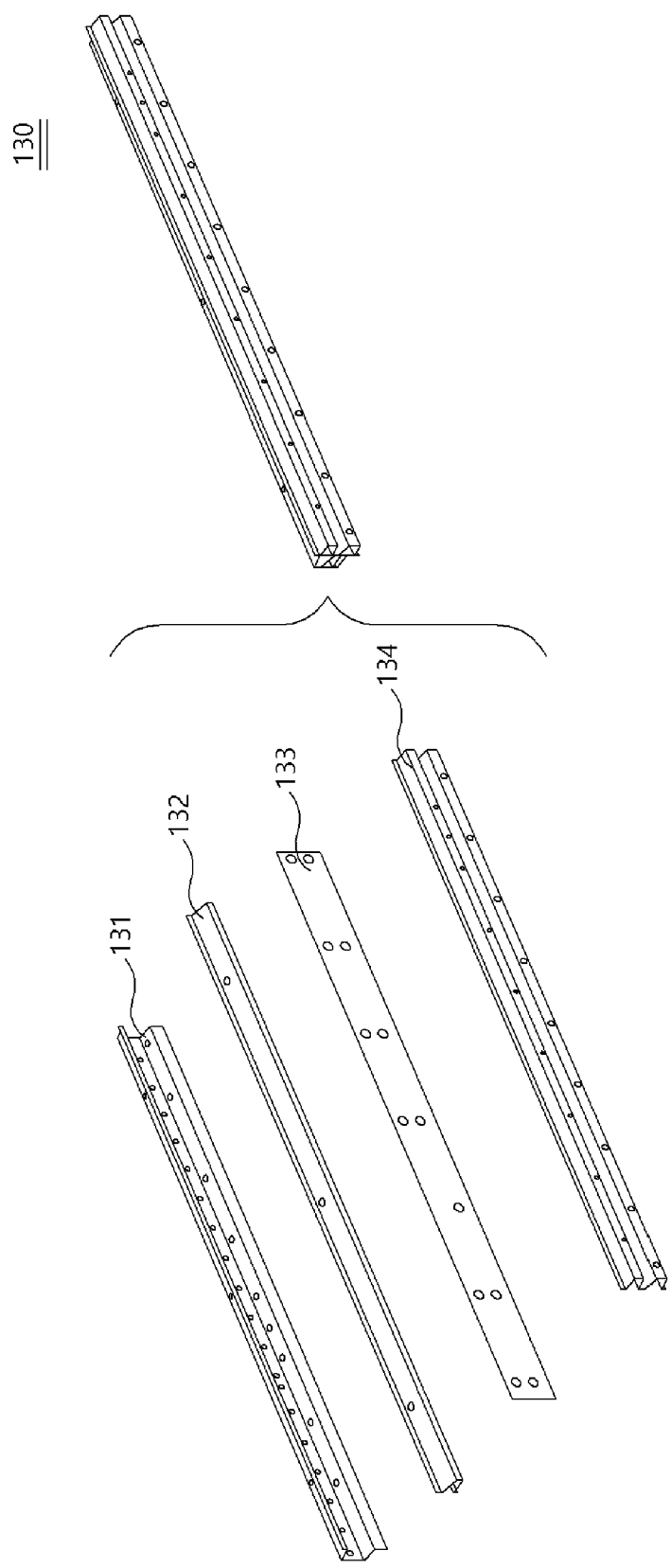
FIG. 1 is an exploded perspective diagram and a perspective diagram showing a side sill reinforcement member of a steel press structure according to the related art.
Figure 2:
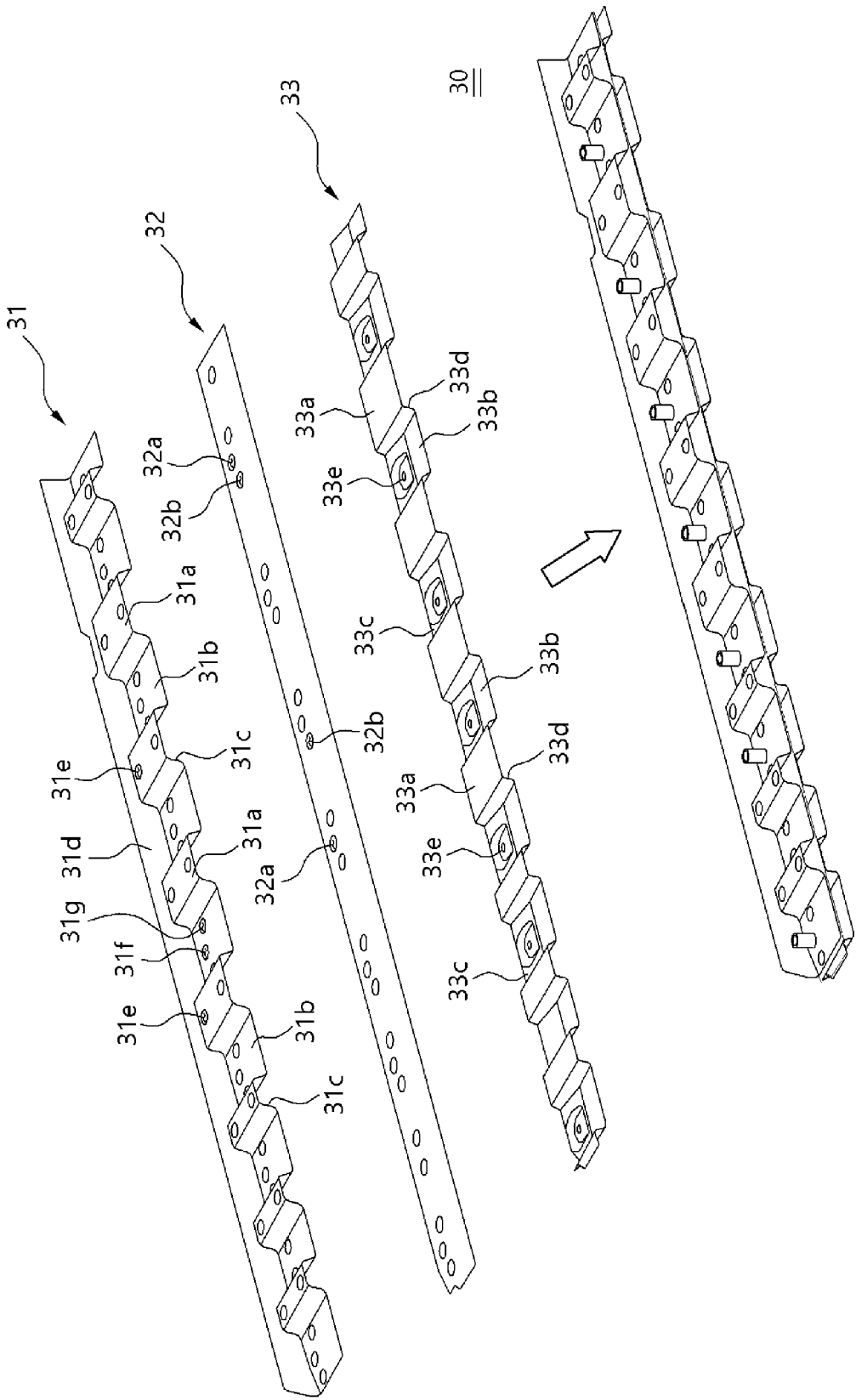
FIG. 2 is an exploded perspective diagram and a perspective diagram showing a reinforcement unit applied to a side sill assembly of a vehicle with reinforced stiffness according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a side sill assembly of a vehicle with reinforced stiffness and a method for manufacturing the same according to various exemplary embodiments of the present invention will be described in detail with reference to the accompanying drawings.

According to a side sill assembly of a vehicle with reinforced stiffness according to various exemplary embodiments of the present invention, in the side sill assembly of the vehicle including a side sill inner 10, a side sill outer 20, and a reinforcement unit 30 provided between the side sill inner 10 and the side sill outer 20, the reinforcement unit 30 may include an upper member 31 having a first upper surface 31a and a first lower surface 31b located lower than the first upper surface 31a alternately disposed in a longitudinal direction of the vehicle, a lower member 33 having a second upper surface 33a and a second lower surface 33b located lower than the first upper surface 33a alternately disposed in the longitudinal direction of the vehicle, and an intermediate member 32 bonded to the upper member 31 and the lower member 33, respectively between the upper member 31 and the lower member 33, in which the upper member 31 and the lower member 33 may be disposed in same phases as each other.

The side sill assembly 1 may have the side sill inner 10 and the side sill outer 20 disposed on a lower portion of a side surface of the vehicle in the longitudinal direction of the vehicle bonded to each other, and may have the side sill reinforcement unit 30 configured to reinforce the stiffness of the side sill assembly 1 (hereinafter referred to as 'reinforcement unit') provided between the side sill inner 10 and the side sill outer 20.

The side sill inner 10 and the side sill outer 20 may have upper bonding portions 11, 21 and lower bonding portions 12, 22 for bonding formed on upper and lower portions thereof, respectively, and intermediate portions formed to be convex in opposite directions to have a space formed therein.

The reinforcement unit 30 may be provided in the space formed between the side sill inner 10 and the side sill outer 20, so that the stiffness of the side sill assembly 1 may be reinforced.

To the present end, the reinforcement unit 30 may include the upper member 31 having the first upper surface 31a and the first lower surface 31b alternately formed, the lower member 33 having the second upper surface 33a and the second lower surface 33b alternately formed in the same phase as that of the upper member 31, and the intermediate member 32 bonded to the upper member 31 and the lower member 33, respectively, between the upper member 31 and the lower member 33.

The upper member 31 may be formed to have the first upper surface 31a and the first lower surface 31b located lower than the first upper surface 31a alternately disposed in the longitudinal direction of the vehicle. The first upper surface 31a and the first lower surface 31b may be connected to each other through a first connection surface 31c. The upper member 31 has the first upper surface 31a and the first lower surface 31b alternately formed and therefore, may have a continuous cross section in an about 'W' shape when looking at the side surface of the vehicle.

The upper member 31 may have a flange portion 31d formed to extend upwards from an inside end portion of the vehicle in a width direction thereof. In other words, the flange portion 31d may be formed on the first upper surface 31a and the first lower surface 31b to extend upwards from the inside end portion of the vehicle in the width direction thereof. The flange portion 31d may be used to be bonded to an inside surface of the side sill inner 10. In other words, the flange portion 31d may be bonded to a surface perpendicular to the inside surface of the side sill inner 10 by welding, so that the reinforcement unit 30 may be bonded to the side sill inner 10. The flange portion 31d may be bonded to the side sill inner 10 by spot welding.

Like the upper member 31, the lower member 33 also may have the second upper surface 33a and the second lower surface 33b alternately formed. In other words, the lower member 33 may include the second upper surface 33a and the second lower surface 33b located lower than the second upper surface 33a. The second upper surface 33a and the second lower surface 33b may be alternately disposed in the longitudinal direction of the vehicle. The lower member 33 having such a structure may have a structure similar to that of the upper member 31. Therefore, the lower member 33 also may have a continuous cross section in an about 'W' shape when looking at the side surface of the vehicle.

The second upper surface 33a and the second lower surface 33b of the lower member 33 may be also connected to each other through a second connection surface 33c.

The upper member 31 and the lower member 33 may be disposed to have the same phases as each other. In other words, the second upper surface 33a may be disposed under the first upper surface 31a, and the second lower surface 33b may be disposed under the first lower surface 31b.

Meanwhile, for bonding with the side sill inner 10, the lower member 33 preferably may have the welding surface 33c formed on a width directional inside of the vehicle of the second lower surface 33b. The welding surface 33c may become a portion of the width directional inside of the vehicle of the second lower surface 33b, and may be formed to be inclined at a regular angle along the inside surface of the side sill inner 10 to be bonded to an inclined surface of the inside surface of the side sill inner 10.

The intermediate member 32 may be located between the upper member 31 and the lower member 33 to be bonded to the upper member 31 and the lower member 33, respectively.

Since the upper member 31 and the lower member 33 may be disposed in same phases as each other, the intermediate member 32 may be interposed therebetween so that the reinforcement unit 30 configured by bonding the upper member 31, the lower member 33, and the intermediate member 32 forms a structure.

The intermediate member 32 may be bonded to the first lower surface 31b of the upper member 31, and bonded to the second upper surface 33a of the lower member 33. The upper member 31 and the lower member 33 may be disposed in the same phases, and a portion where the intermediate member 32 may be bonded to the upper member 31 and a portion where the intermediate member 32 may be bonded to the lower member 33 are alternately located on the intermediate member 32.

Since the upper member 31 and the lower member 33 may have the upper and lower surfaces continuously formed, respectively to have a W shape, and the intermediate member 32 may be relatively flat, the first lower surface 31b of the upper member 31 may be bonded to the upper surface of the intermediate member 32 by welding, and the second upper surface 33a of the lower member 33 may be bonded to the lower surface of the intermediate member 32 by welding. Therefore, the upper member 31, the intermediate member 32, and the lower member 33 may be integrated to form the reinforcement unit 30. The upper member 31 and the intermediate member 32 may be bonded by spot welding, and the intermediate member 32 and the lower member 33 may be also bonded by spot welding.

Meanwhile, in case of the upper member 31, the intermediate member 32, and the lower member 33, the upper member 31 and the intermediate member 32 may be first bonded by welding, and then the lower member 33 may be bonded to the intermediate member 32 by welding. The upper member 31 may be formed with a first welding hole 31e through which a welding tool may pass when the lower member 33 is welded to the intermediate member 32. In other words, the first upper surface 31a of the upper member 31 may be formed with the first welding hole 31e through which the welding tool may pass.

A lower end portion of the battery mounting nut 34 configured to mount the high-voltage battery 40 may be bonded to the welding surface 33c. A nut mounting surface 33e may be formed so that the lower end portion of the battery mounting nut 34 may be located on the welding surface 33c, and the lower end portion of the battery mounting nut 34 may be bonded to the nut mounting surface 33e. The battery mounting nut 34 may be bonded to the nut mounting surface 33e by $CO_2$ welding or projection welding.

Each of the upper member 31 and the intermediate member 32 may be formed with a through hole 31f, 32a through which the battery mounting nut 34 is provided to penetrate. The battery mounting nut 34 may have an outside circumference bonded to inside circumferences of the through holes 31f, 32a by $CO_2$ welding. Since the battery mounting nut 34 has the lower end portion welded to the lower member 33 side, an intermediate portion welded to the upper member 31 and the intermediate member 32, it may also serve to prevent the upper member 31, the intermediate member 32, and the lower member 33 from being separated from each other.

Furthermore, the upper member 31 and the intermediate member 33 may be formed with a second welding hole 31g and a third welding hole 32b, respectively. In a state where the upper member 31, the intermediate member 32, and the lower member 33 are bonded to each other by welding to form the reinforcement unit 30, the welding tool may be required to enter therein to bond the welding surface 33c of the lower member 33 to the inclined surface of the inside surface of the side sill inner 10 when the reinforcement unit 30 is bonded to the side sill inner 10, and therefore, the first lower surface 31b of the upper member 31 and the intermediate member 32 may be formed with the second welding hole 31g and the third welding hole 32b, respectively so that the welding too can enter therein. The second welding hole 31g and the third welding hole 32b may be formed at locations corresponding to each other to become one hole when the upper member 31 and the intermediate member 32 are bonded to each other.

A method for manufacturing the side sill assembly of the vehicle with reinforced stiffness according to various exemplary embodiments of the present invention will be referred to as follows.

Figure 8:
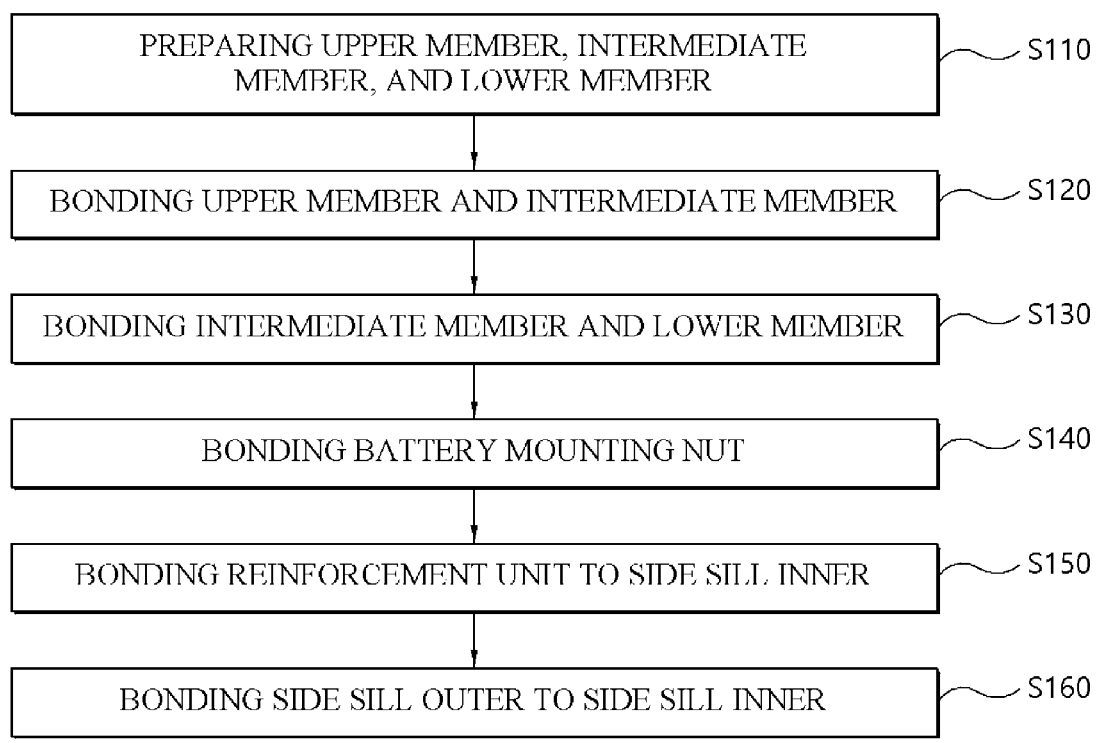
FIG. 8 is a flowchart illustrating detailed operations of a method for manufacturing the side sill assembly of the vehicle with reinforced stiffness according to according to various exemplary embodiments of the present invention.

As shown in FIG. 8, the method for manufacturing the side sill assembly of the vehicle with reinforced stiffness according to various exemplary embodiments of the present invention may include a preparing step (S110) that process and prepares the upper member 31, the intermediate member 32, and the lower member 33 in advance, an upper member bonding step (S120) that bonds the upper member 31 to the upper surface of the intermediate member 32, a lower member bonding step (S130) that bonds the lower member 33 to the lower surface of the intermediate member 32, a reinforcement unit bonding step (S150) that bonds the reinforcement unit 30 formed by bonding the upper member 31, the intermediate member 32, and the lower member 33 to the side sill inner 10, and a side sill outer bonding step (S160) that bonds the upper and lower portions of the side sill inner 10 to the upper and lower portions of the side sill outer 20.

The preparing step (S110) may process and prepare the upper member 31, the lower member 33, and the intermediate member 32, which are described above, in advance. The upper member 31, the lower member 33, and the intermediate member 32 may be processed to have the respective shapes through a press processing, etc. of a steep plate material, and prepared.

Figure 3:
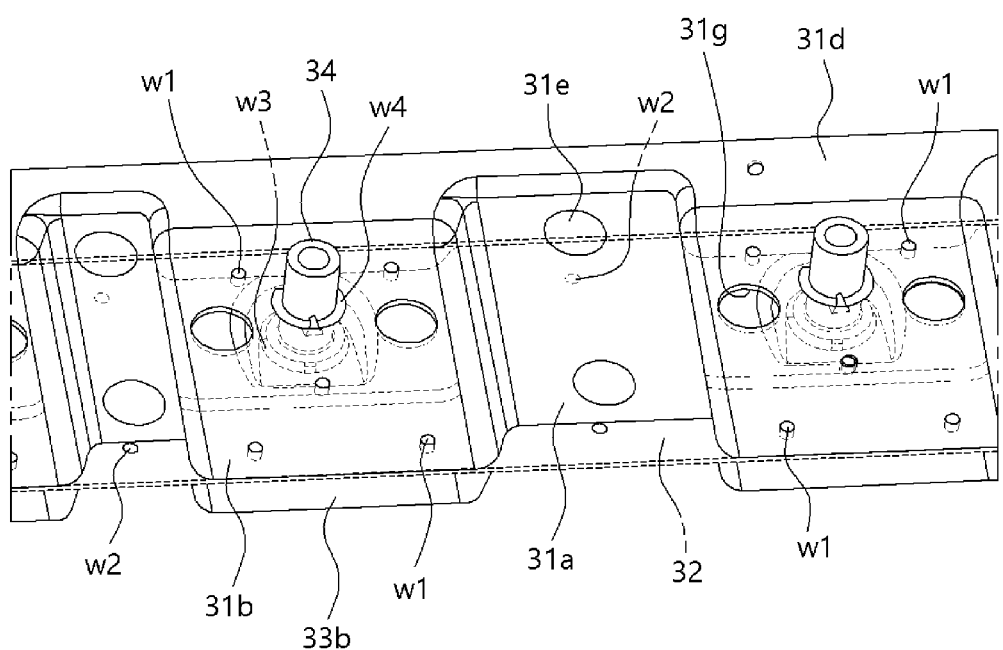
FIG. 3 is an enlarged perspective diagram of the reinforcement unit applied to the side sill assembly of the vehicle with reinforced stiffness according to various exemplary embodiments of the present invention.
Figure 4:
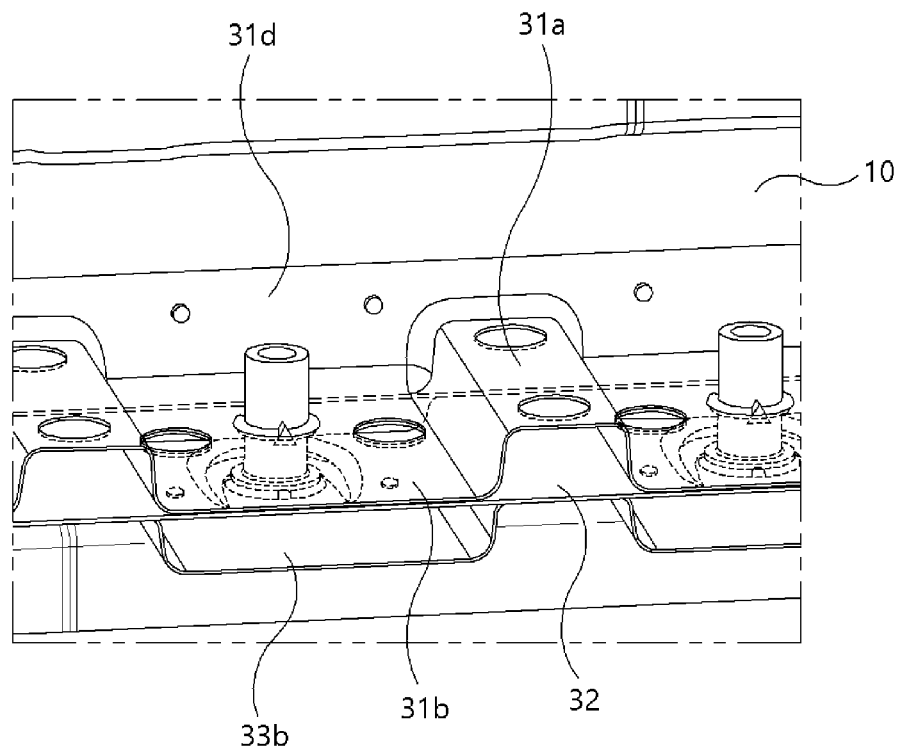
FIG. 4 is a perspective diagram showing a state where the reinforcement unit is bonded to a side sill according to the side sill assembly of the vehicle with reinforced stiffness according to various exemplary embodiments of the present invention.

The upper member bonding step (S120) may bond the upper member 31 to the upper surface of the intermediate member 32. The upper surface of the intermediate member 32 may be located to be in contact with the first lower surface 31b of the upper member 31, and then the first lower surface 31b and the intermediate member 32 may be bonded by spot welding (indicated by 'w1' in FIG. 3), and therefore, the upper member 31 and the intermediate member 32 may be bonded.

The lower member bonding step (S130) may bond the lower member 33 to the lower surface of the intermediate member 32. The lower surface of the intermediate member 32 may be located to be in contact with the second upper surface 33a of the lower member 33, and then the second upper surface 33a and the intermediate member 32 may be bonded by spot welding (indicated by 'w2' in FIG. 3), and therefore, the lower member 33 and the intermediate member 32 may be bonded. In the lower member bonding step (S130), the upper member 31 may be in a state of being already bonded to the intermediate member 32, and therefore, the lower member 33 and the intermediate member 32 may be bonded after the welding tool enters the first welding hole 31e.

A nut bonding step (S140) may bond the lower end portion of the battery mounting nut 34 to the lower member 33, and may bond the upper member 31 and the intermediate member 32 to the circumference of the battery mounting nut 34. In a state where the lower end portion of the battery mounting nut 34 is located on the nut mounting surface 33e formed on the lower member 33, the lower end portion of the battery mounting nut 34 may be bonded to the lower member 33 through $CO_2$ welding or projection welding (indicated by 'w3' in FIG. 3). Thereafter, an outside circumference of the battery mounting nut 34 and the inside circumferences of the through holes 31f, 32a formed in the upper member 31 and the intermediate member 32 may be bonded by $CO_2$ welding to fix the intermediate portion of the battery mounting nut 34 (indicated by 'w4' in FIG. 3). At the instant time, the upper member 31, the intermediate member 32, and the lower member 33 may be bonded to the battery mounting nut 34, preventing the upper member 31 and the intermediate member 32 from being separated from the lower member 33.

The reinforcement unit bonding step (S150) may bond the reinforcement unit 30 formed by bonding the upper member 31, the intermediate member 32, and the lower member 33 to the side sill inner 10.

The reinforcement unit bonding step (S150) may bond the flange portion 31d formed to extend upwards from the width directional inside end portion of the vehicle of the upper member 31 to the surface perpendicular to the inside surface of the side sill inner 10 by spot welding.

Furthermore, the welding surface 33c located on the width directional interior of the vehicle of the lower member 33 may be bonded to the inclined surface of the inside surface of the side sill inner 10 by spot welding, and therefore, the reinforcement unit 30 may be bonded to the side sill inner 10. At the instant time, when the reinforcement unit 30 and the side sill inner 10 are welded, the welding tool may pass through the second welding hole 31g and the third welding hole 32b so that the welding surface 33c may be welded to the inside surface of the side sill inner 10.

Thereafter, the side sill outer bonding step (S160) that bonds the side sill outer 20 to the side sill inner 10 may be performed. In the side sill outer bonding step (S160), the upper bonding portion 11 and lower bonding portion 12 of the side sill inner 10 are welded and bonded to the upper bonding portion 21 and lower bonding portion 22 of the side sill outer 20, and therefore, the side sill assembly 1 may be completely manufactured.

According to the side sill assembly 1 according to various exemplary embodiments of the present invention, the reinforcement unit 30 may reinforce the stiffness of the side sill assembly 1 against the laterally input load, enhancing stability against the side collision.

Figure 5A:
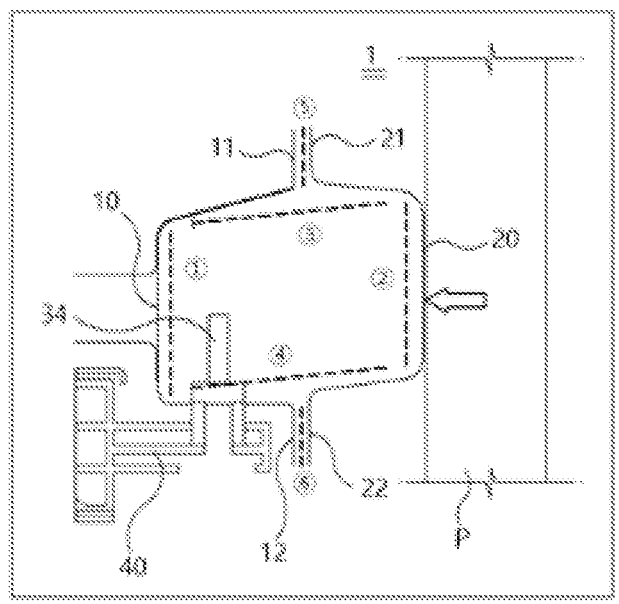
FIG. 5 is a perspective diagram showing a state where the reinforcement unit is coupled to the side sill and a high-voltage battery according to the side sill assembly of the vehicle with reinforced stiffness according to various exemplary embodiments of the present invention.
Figure 5B:
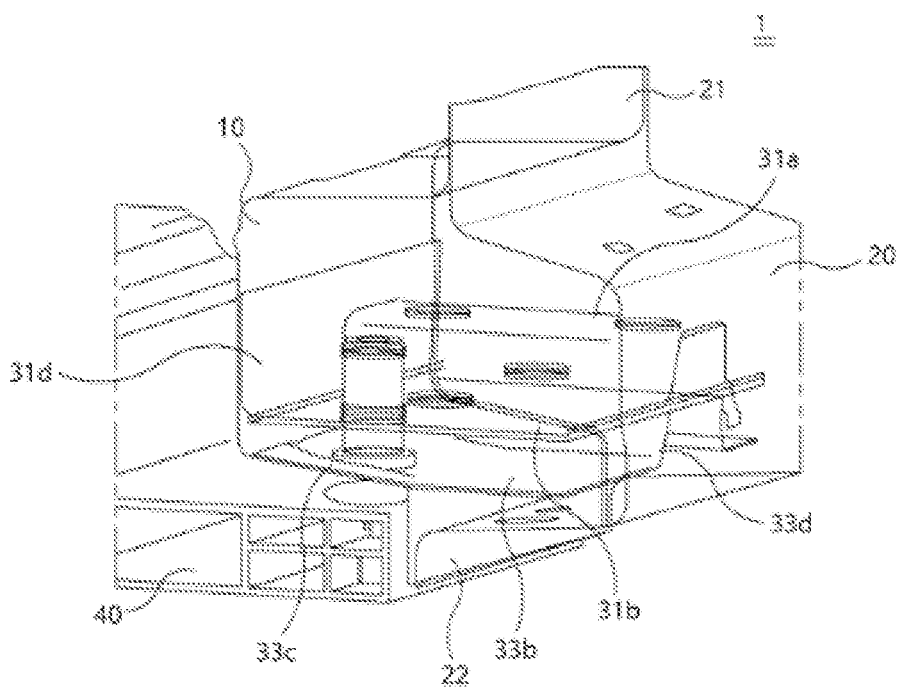
Figure 6:
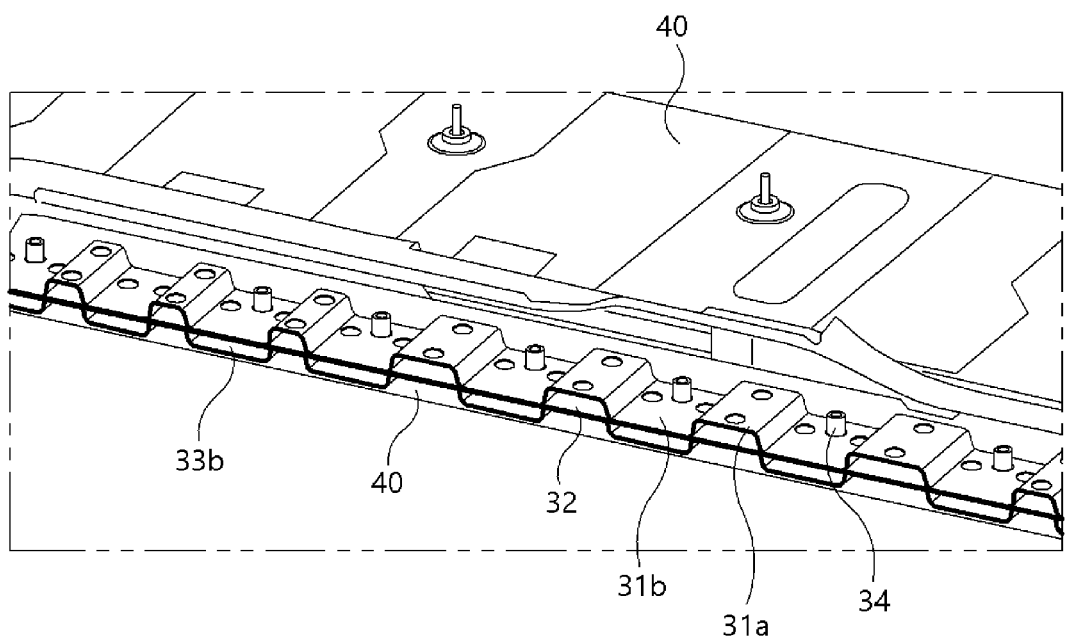
FIG. 6 and FIG. 7 are perspectives diagrams showing the state where the reinforcement unit is coupled to the side sill and the high-voltage battery according to the side sill assembly of the vehicle with reinforced stiffness according to various exemplary embodiments of the present invention.
Figure 7:
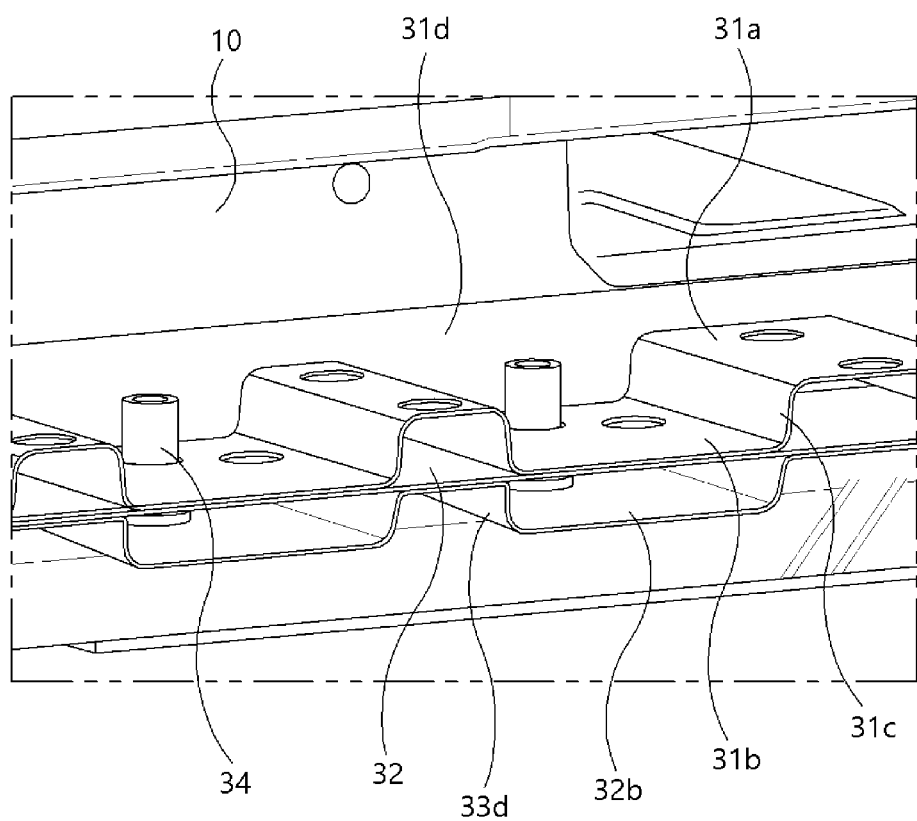

The side sill assembly 1 including the side sill inner 10 and the side sill outer 20 may have surfaces indicated by ① to ⑥ of FIG. 5. In other words, in the event of the side collision, the side sill assembly 1 may have surfaces (①, ②) directly forming sidewalls, surfaces (③, ④) connecting the sidewalls, and surfaces (⑤, ⑥) assembling the inside and outside of the side sill with parts. Here, as in a case where the side surface of the vehicle and a utility pole (P) collide, to improve the side collision performance, it is good to directly connect the surfaces (①, ②), and if impossible, the surfaces (③, ④) should be connected. However, the conventional aluminum extruded structure and steel press welding structure have the structure of connecting only the surfaces (⑤, ⑥).

However, as the reinforcement unit 30 is applied, the surface (①) may be bonded to the flange portion 31b of the upper member 31, and the surface (④) may be bonded to the welding surface 33c of the lower member 33. The present invention may have the same number of matched surfaces as that of the conventional steel press welding structure, but may restrict the surface (①) that exerts the largest resistance against the side collision, improving the side collision performance.

Furthermore, it is possible to achieve the lightweight structure and the improved stiffness using the steel which is a relatively inexpensive material.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A side sill assembly of a vehicle with reinforced stiffness, the side sill assembly comprising:
   a side sill inner, a side sill outer, and a reinforcement unit provided between the side sill inner and the side sill outer,
   wherein the reinforcement unit includes:
   an upper member having a first upper surface and a first lower surface located lower than the first upper surface, wherein the first upper surface and the first lower surface are alternately disposed in a longitudinal direction of the vehicle;
   a lower member having a second upper surface and a second lower surface located lower than the second upper surface, wherein the second upper surface and the second lower surface are alternately disposed in the longitudinal direction of the vehicle; and
   an intermediate member bonded to the upper member and the lower member, respectively, between the upper member and the lower member.

2. The side sill assembly of claim 1,
   wherein the first upper surface and the first lower surface of the upper member are alternatively formed and the second upper surface and the second lower surface of the lower member are alternatively formed, and
   wherein the first upper surface and the first lower surface of the upper member correspond to the second upper surface and the second lower surface of the lower member.

3. The side sill assembly of claim 1,
   wherein the first lower surface of the upper member is bonded to an upper surface of the intermediate member,
   wherein the second upper surface of the lower member is bonded to a lower surface of the intermediate member, and
   wherein a portion where the intermediate member is bonded to the upper member and a portion where the intermediate member is bonded to the lower member are alternately located on the intermediate member.

4. The side sill assembly of claim 1,
   wherein a flange portion extends upwards from the first upper surface and the first lower surface of the upper member, and
   wherein the flange portion is bonded to an inside surface of the side sill inner.

5. The side sill assembly of claim 1,
   wherein a width directional inside of the vehicle of the second lower surface of the lower member is a welding surface bonded to an inclined surface of an inside surface of the side sill inner.

6. The side sill assembly of claim 5,
   wherein the lower member includes a nut mounting surface on which a lower end portion of a battery mounting nut configured to mount a battery on the welding surface is located, and wherein the battery mounting nut has a lower end portion bonded to the nut mounting surface.

7. The side sill assembly of claim 6, wherein the lower end portion of the battery mounting nut is bonded to the welding surface by $CO_2$ welding or projection welding.

8. The side sill assembly of claim 6, wherein the first lower surface of the upper member and the intermediate member include first and second through holes through which the battery mounting nut is provided to penetrate, respectively.

9. The side sill assembly of claim 8, wherein the battery mounting nut is bonded to the first lower surface of the upper member and the intermediate member on portions formed with the first and second through holes by CO2 welding.

10. The side sill assembly of claim 1, wherein the first upper surface and first lower surface of the upper member are connected by a first connection surface, and wherein the second upper surface and second lower surface of the lower member are connected by a second connection surface.

11. The side sill assembly of claim 1, wherein the upper member includes a first welding hole through which a welding tool passes when the lower member and the intermediate member are bonded to the first upper surface of the upper member.

12. The side sill assembly of claim 1, wherein the intermediate member is bonded to the upper member and the lower member by spot welding.

13. The side sill assembly of claim 1, wherein the upper member and the lower member are bonded to the side sill inner by spot welding.

14. The side sill assembly of claim 1, wherein the first lower surface of the upper member and the intermediate member include a second welding hole and a third welding hole, respectively, so that a welding tool passes through the second welding hole and the third welding hole when the lower member and the side sill inner are bonded.

15. A method for manufacturing a side sill assembly of a vehicle with reinforced stiffness, the method comprising:

processing and preparing an upper member, a lower member, and an intermediate member in advance;

bonding the upper member to an upper surface of the intermediate member;

bonding the lower member to a lower surface of the intermediate member;

bonding a reinforcement unit formed by bonding the upper member, the intermediate member and the lower member, to a side sill inner;

bonding upper and lower portions of a side sill outer to upper and lower portions of the side sill inner; and bonding a lower end portion of a battery mounting nut to the lower member, and bonding a circumference of the battery mounting nut to the upper member and the intermediate member between a step of the bonding of the lower member and a step of the bonding of the reinforcement unit.

16. The method of claim 15, wherein the bonding of the upper member, the bonding of the lower member, and the bonding of the reinforcement unit are performed by spot welding.

17. The method of claim 15, wherein the lower end portion of the battery mounting nut is bonded to the lower member by $CO_2$ welding or projection welding, and wherein the circumference of the battery mounting nut and the upper and intermediate members are bonded by $CO_2$ welding.

18. The method of claim 15, further including:

in the bonding of the reinforcement unit, bonding a flange portion formed to extend upwards from a width directional inside end portion of the vehicle of the upper member to a surface to an inside surface of the side sill inner, and bonding a welding surface located on a width directional inside of the vehicle of the lower member to an inclined surface of the inside surface of the side sill inner.

* * * * *